United States Patent
Kim et al.

(10) Patent No.: US 8,818,605 B2
(45) Date of Patent: Aug. 26, 2014

(54) DEVICE AND METHOD FOR PROVIDING NAVIGATION INFORMATION

(75) Inventors: Kyong Ho Kim, Daejeon (KR); Hyunsuk Kim, Daejeon (KR); Daesub Yoon, Daejeon (KR); Jong-woo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 316 days.

(21) Appl. No.: 12/869,418

(22) Filed: Aug. 26, 2010

(65) Prior Publication Data

US 2011/0054786 A1  Mar. 3, 2011

(30) Foreign Application Priority Data

Aug. 26, 2009  (KR) .................. 10-2009-0079314
Aug. 23, 2010  (KR) .................. 10-2010-0081342

(51) Int. Cl.
*G01C 21/00* (2006.01)
*G05D 1/00* (2006.01)

(52) U.S. Cl.
USPC .......................................... 701/23

(58) Field of Classification Search
None
See application file for complete search history.

(56) References Cited

U.S. PATENT DOCUMENTS

| 5,642,093 A * | 6/1997 | Kinoshita et al. ............. 340/439 |
| 7,672,764 B2 * | 3/2010 | Yoshioka et al. ............. 701/32.3 |
| 2004/0225416 A1 * | 11/2004 | Kubota et al. ..................... 701/1 |

FOREIGN PATENT DOCUMENTS

| JP | 10-82653 | 3/1998 |
| JP | 2003-222531 | 8/2003 |
| KR | 1998-043951 | 9/1998 |
| KR | 1998-077067 | 11/1998 |
| KR | 1020050008188 | 1/2005 |
| KR | 1020050089253 | 9/2005 |
| KR | 1020090019203 | 2/2009 |
| KR | 1020090029442 | 3/2009 |

* cited by examiner

*Primary Examiner* — Paul Danneman
(74) *Attorney, Agent, or Firm* — Nelson Mullins Riley & Scarborough LLP

(57) ABSTRACT

A navigation information providing device recognizes traveling status information of a vehicle senses a behavioral state or physiological state of a driver to recognize the driver's situation information and sets a rule including a form and a time for navigation information to be provided to the driver per traveling status information and driver's situation information. The navigation information providing device searches navigation information that corresponds to the driver's situation information and the vehicle's traveling status information, determines the form and time of navigation information to satisfy the rule, and provides navigation information to the driver according to the determined form and time.

13 Claims, 2 Drawing Sheets

DEVICE AND METHOD FOR PROVIDING NAVIGATION INFORMATION

CROSS-REFERENCE TO RELATED APPLICATION

This application claims priority to and the benefit of Korean Patent Application Nos. 10-2009-0079314 and 10-2010-0081342 filed in the Korean Intellectual Property Office on Aug. 26, 2009 and Aug. 23, 2010, the entire contents of which are incorporated herein by reference.

BACKGROUND OF THE INVENTION (a) Field of the Invention

The present invention relates to a navigation information providing device and method. Particularly, the present invention relates to a navigation information providing device and method based on a driver's status and traveling state.

(b) Description of the Related Art

A large amount of car accidents happen because of the driver's carelessness or faults.

Recently, the types and number of various information technology (IT) devices installed and used in the car have been steeply increased. The devices disperse the driver's driving attention and increase driving workloads to function as a serious harming factor against safe driving.

Particularly, the navigation system is one of the most representative factors that disperse the visual attention from among the driving attentions.

The current navigation system provides navigation information to the driver in no consideration of the driver's condition or the vehicle's traveling status. For example, the navigation device scatters the driver's attention by providing map information or routing information in the situation in which the driver must attentively check the running vehicles and the traffic condition such as entering an intersection. Accordingly, the driver may fail to accurately understand the traffic flow to generate minor collisions or fatal accidents.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a navigation information providing device and method based on the vehicle's traveling condition and the driver's status.

An exemplary embodiment of the present invention provides a method for providing navigation information including: recognizing a driver's situation information and a vehicle's traveling status information; searching navigation information that corresponds to the driver's situation information and the vehicle's traveling status information; determining a form and a time for providing the navigation information to the driver; and providing the navigation information to the driver according to the determined form and time.

Another embodiment of the present invention provides a device for navigation information including: a first recognizer for recognizing traveling status information of a vehicle; a second recognizer for sensing the driver's behavioral state or physiological state, and recognizing the driver's situation information based on the sensing result; a rule information unit for setting a rule including a form and a time of navigation information to be provided to the driver for each traveling status information and driver's situation information; an information controller for searching navigation information that corresponds to the driver's situation information and the vehicle's traveling status information, and determining a form and a time of navigation information to correspond to the rule; and an information output unit for providing the navigation information to the driver according to the determined form and the time.

DETAILED DESCRIPTION OF THE EMBODIMENTS

Figure 1:
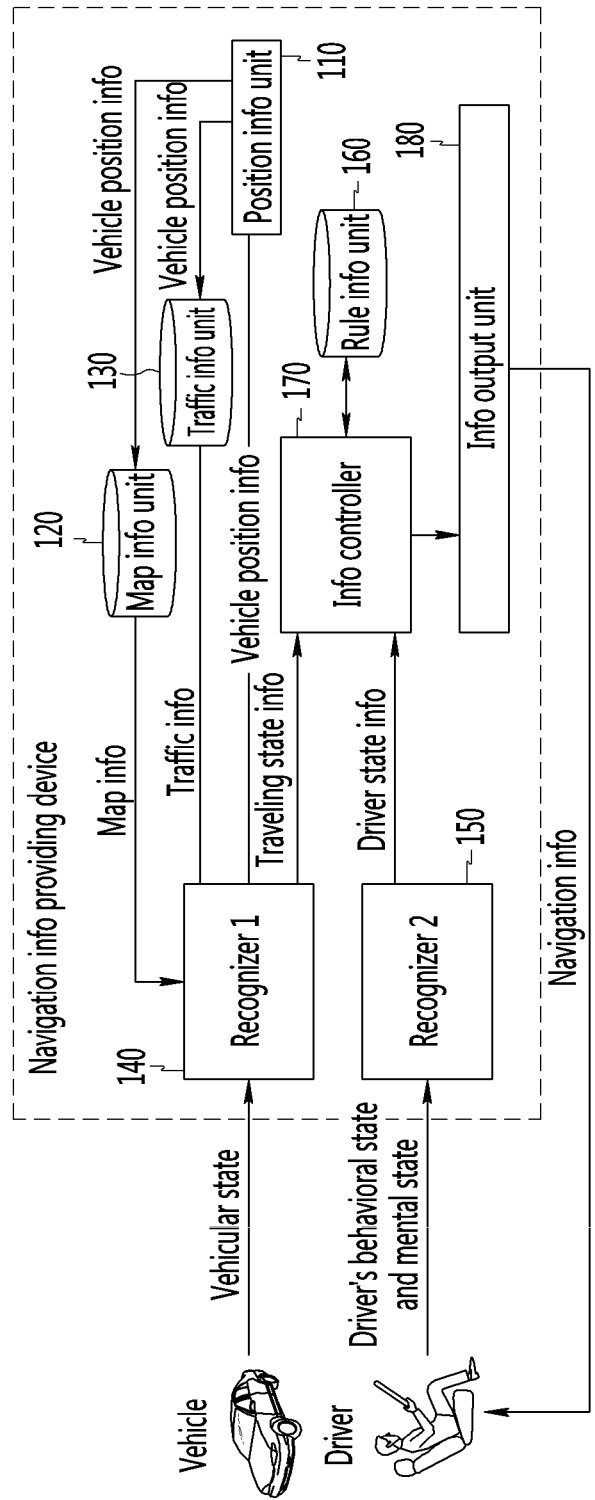
FIG. 1 shows a navigation information providing device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

A navigation information providing device and method according to an exemplary embodiment of the present invention will now be described in detail with reference to accompanying drawings.

A navigation information providing device according to an exemplary embodiment of the present invention is applicable to a navigation system that provides navigation information, and it is not restricted thereto. Here, navigation information includes destination information for providing routing guidance to the driver, and global positioning system (GPS) information of the current position.

FIG. 1 shows a navigation information providing device according to an exemplary embodiment of the present invention.

As shown in FIG. 1, the navigation information providing device includes a position information unit 110, a map information unit 120, a traffic information unit 130, a first recognizer 140, a second recognizer 150, a rule information unit 160, an information controller 170, and an information output unit 180.

The position information unit 110 detects a current position of a vehicle, and transmits vehicle position information that corresponds to the detection result to the map information unit 120, the traffic information unit 130, and the first recognizer 140.

The position information unit 110 can includes a global positioning system (GPS) generally included by the navigation system, and the present invention is not restricted thereto.

The map information unit 120 receives vehicle position information from the position information unit 110 to collect information on the area that corresponds to vehicle position information, that is, map information. Here, map information represents information on the road that corresponds to the area that corresponds to vehicle position information, and for example, it includes a lane on which the current traveling vehicle runs, whether the vehicle runs near the intersection, speed limit, allowance of turning left, and point-of-interest (POI). In this instance, the POI includes building and shops displayed on the map.

The traffic information unit 130 receives the vehicle position information from the position information unit 110 to collect traffic information on the area that corresponds to the vehicle position information. Here, the traffic information includes traffic congestion of the road that corresponds to the area that corresponds to the vehicle position information, accident occurrence state, and climate.

The first recognizer 140 recognizes traveling status information of the vehicle. In this instance, the traveling status information includes the vehicle's position, progressing direction, traffic status, intersection entrance state, and road type.

In detail, the first recognizer 140 recognizes traveling status information based on vehicle position information, map information, traffic information, and vehicle state provided by the vehicle. Here, the vehicle state includes traveling information that can be sensed from the vehicle, including vehicle speed, acceleration, wheel steering angle, and brake pushing force.

The second recognizer 150 senses the driver's behavioral state or physiological state, and recognizes the driver's situation information based on the behavioral state information or physiological state information that corresponds to the sensing result. Here, the behavioral state includes motions or states of the driver including motions of the head, legs, feet, gesture, and voice. Also, the physiological state includes the driver's pulse rate, temperature, electromyogram, blood pressure, and brainwave.

That is, the second recognizer 150 recognizes driver's status information including the driver's attention dispersion, driving load, and stress based on the driver's behavioral state information or physiological state information. Further, the driver's status information includes the driver's behavioral state information or physiological state information.

The first recognizer 140 or the second recognizer 150 are illustrated to be provided in the navigation information providing device, and it can also be provided outside the same.

The rule information unit 160 sets a rule including sorts and time of navigation information to be provided to the driver per traveling status information and driver's status information. In this instance, navigation information is classified by the forms for providing the navigation information to the driver as auditory information such as voice or sound, visual information such as graphic data or text, tactile information such as vibration, and olfactory information such as smell. Further, the forms of navigation information include output levels of navigation information for the information in the same form, for example, sound volume or high and low state of frequency. Also, the time of navigation information indicates the time to provide navigation information to the driver.

The information controller 170 searches for navigation information that corresponds to the received traveling status information and driver's status information, and determines the form and the time of navigation information to correspond to the rule that corresponds to the searched navigation information.

The information output unit 180 outputs the navigation information searched by the information controller 170 to the driver according to the determined form and time.

For example, when traveling status information recognized by the first recognizer 140 corresponds to the time when the current vehicle enters the congested intersection, a section is recognized to have a high demand about detecting a traffic signal and a traffic flow, and the driver's situation information recognized by the second recognizer 150 corresponds to the case in which the driver's driving load is increased such as the driver's pulse rate is increased or his blood pressure is increased, the information controller 170 determines to provide not map information which requires the driver's visual attention much but navigation information in the auditory or vibrating form. That is, the navigation information providing device can increase driving safety in the dangerous section such as the intersection congested by vehicles.

Also, the first recognizer 140 recognizes traveling status information such that the current vehicle must turn left on the next intersection but forcible turning left may cause an accident because of traffic congestion, the information controller 170 temporarily stops providing navigation information to turn left, and controls to provide the information to turn left when the vehicle congestion is lowered and the rate of risk is reduced.

A method for providing navigation information will now be described with reference to FIG. 2.

Figure 2:
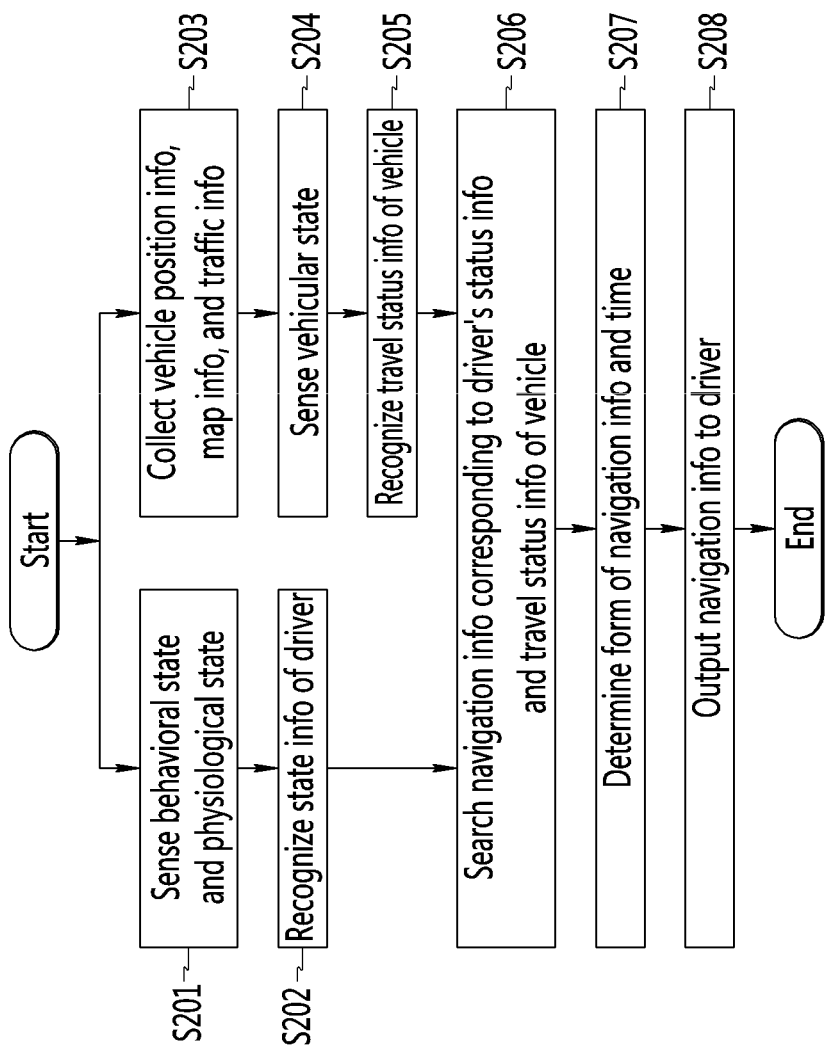
FIG. 2 shows a flowchart of a navigation information providing method according to an exemplary embodiment of the present invention.

FIG. 2 shows a flowchart of a navigation information providing method according to an exemplary embodiment of the present invention.

As shown in FIG. 2, the navigation information providing device senses the driver's behavioral state or physiological state (S201). Here, the behavioral state includes motions or states of the driver including motions of the head, legs, feet, gesture, and voice. Also, the physiological state includes the driver's pulse rate, temperature, electromyogram, blood pressure, and brainwave.

The navigation information providing device recognizes the driver's situation information based on the sensing result, that is, behavioral state information or physiological state information (S202).

The navigation information providing device collects vehicle position information that corresponds to the current position of the vehicle, map information that is information of the area that corresponds to the vehicle position information, and traffic information of the area that corresponds to the vehicle position information (S203). Here, map information includes in what lane the current traveling vehicle runs, whether the vehicle runs near the intersection, speed limit, allowance of turning left, and point-of-interest (POI), and traffic information includes traffic congestion of the road that corresponds to the area that corresponds to the vehicle position information, accident occurrence state, and climate.

The navigation information providing device senses the vehicle's vehicle state (S204). Here, the vehicle state includes traveling information that can be sensed from the vehicle, including vehicle speed, acceleration, wheel steering angle, and brake pushing force.

The navigation information providing device recognizes the vehicle's traveling status information based on vehicle position information, map information, traffic information, and sensed vehicle state (S205).

The navigation information providing device searches navigation information that corresponds to traveling status information and driver's status information (S206).

The navigation information providing device determines the form and the time for providing navigation information to the driver corresponding to the searched navigation information (S207).

The navigation information providing device outputs navigation information to the driver according to the determined form and the time (S208).

Accordingly, the navigation information providing device according to an exemplary embodiment of the present invention reduces risks and maximizes safe driving by providing navigation information to the driver at the most securest time and in the appropriate form.

In addition, according to an embodiment of the present invention, the navigation information providing device and method can provide navigation information to the driver securely and conveniently based on the vehicle's traveling state and the driver's condition.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for providing navigation information comprising:
   recognizing, by a navigation information providing device, a driver's situation information and a vehicle's traveling status information;
   setting a rule including the form and time of the navigation information for each driver's situation information and vehicle's traveling status information;
   searching navigation information that corresponds to the driver's situation information and the vehicle's traveling status information;
   determining a form and a time for providing the navigation information to the driver; and
   providing the navigation information to the driver according to the determined form and time,
   wherein the navigation information includes destination information for providing routing guidance to the driver, and global positioning system (GPS) information of the current position, and
   the determining includes
   determining a form and a time for providing the navigation information to the driver corresponding to the rule,
   the form of the navigation information is at least one of auditory information, visual information, tactile information, and olfactory information, and
   output levels of the navigation information vary based on the driver's situation information and the vehicle's traveling status information.

2. The method of claim 1, wherein the output levels of the navigation information include sound volume or high and low state of frequency.

3. The method of claim 1, wherein,
   the determining includes determining the time for providing the navigation information in consideration of driving safety based on the vehicle's traveling status information.

4. The method of claim 1, wherein
   the recognizing includes:
   sensing the driver's behavioral state or physiological state; and
   recognizing the driver's situation information based on the sensing result, that is, the driver's behavioral state information or physiological state information.

5. The method of claim 4, wherein
   the driver's behavioral state includes at least one motion or state of the driver from among the driver's motions of the head, legs, feet, gesture, and voice, and
   the driver's physiological state includes at least one of the driver's pulse rate, temperature, electromyogram, blood pressure, and brainwave.

6. The method of claim 1, wherein
   the recognizing includes:
   collecting vehicle position information that corresponds to the vehicle's current position, map information that corresponds to the vehicle position information, and traffic information of an area that corresponds to the vehicle position information;
   sensing a state of the vehicle; and
   recognizing traveling status information of the vehicle based on the vehicle position information, map information, traffic information, and sensed vehicle state.

7. The method of claim 6, wherein
   the map information includes at least one of a lane on which the current traveling vehicle runs, whether the vehicle runs near the intersection, speed limit, allowance of turning left, and buildings or shops, and
   the traffic information includes at least one of traffic congestion of the road that corresponds to the area that corresponds to the vehicle position information, accident occurrence state, and climate.

8. A device for navigation information comprising a computing device which is configured to execute:
   a first recognizer for recognizing traveling status information of a vehicle;
   a second recognizer for sensing the driver's behavioral state or physiological state, and recognizing the driver's situation information based on the sensing result;
   a rule information unit for setting a rule including a form and a time of navigation information to be provided to the driver for each traveling status information and driver's situation information;
   an information controller for searching navigation information that corresponds to the driver's situation information and the vehicle's traveling status information, and determining a form and a time of navigation information to correspond to the rule; and
   an information output unit for providing the navigation information to the driver according to the determined form and the time,
   wherein the navigation information includes destination information for providing routing guidance to the driver, and global positioning system (GPS) information of the current position, and
   the form of the navigation information is at least one of auditory information, visual information, tactile information, and olfactory information and
   output levels of the navigation information vary based on the driver's situation information and the vehicle's traveling status information.

9. The device of claim 8, wherein
   the information controller determines the form of the navigation information as at least one of auditory information, visual information, tactile information, and olfactory information according to the rule, and determines the time to provide the navigation information to the driver according to the rule.

10. The device of claim 8, further including:
a position information unit for detecting the vehicle's current position information;
a map information unit for collecting map information including at least one of a lane on which the current traveling vehicle runs, whether the vehicle runs near the intersection, speed limit, allowance of turning left, and buildings or shops; and
a traffic information unit for collecting traffic information that corresponds to an area that corresponds to the position information.

11. The device of claim 10, wherein
the first recognizer recognizes the vehicle's traveling status information based on the position information, map information, traffic information, and the vehicle state transmitted by the vehicle.

12. The device of claim 8, wherein
the driver's behavioral state includes at least one motion or state of the driver's motions of the head, legs, feet, gesture, and voice, and
the driver's physiological state includes at least one of the driver's pulse rate, temperature, electromyogram, blood pressure, and brainwave.

13. The device of claim 8, wherein
the navigation information includes at least one of destination information and current position information desired by the driver.

\* \* \* \* \*